United States Patent [19]

Ball et al.

[11] Patent Number: 5,013,358
[45] Date of Patent: May 7, 1991

[54] METHOD FOR THE RECOVERY OF MERCURY FROM MERCURY-CONTAINING MATERIAL

[75] Inventors: Donald L. Ball, Castlegar; Daniel A. D. Boateng, Montrose, both of Canada

[73] Assignee: Cominco Ltd., Vancouver, Canada

[21] Appl. No.: 399,140

[22] Filed: Aug. 28, 1989

[51] Int. Cl.$^5$ ............................................. C22B 43/00
[52] U.S. Cl. .................................................... 75/742
[58] Field of Search .......................................... 75/742

[56] References Cited

U.S. PATENT DOCUMENTS 3,639,118  2/1972  O'Grady .............................. 75/742

Primary Examiner—Peter D. Rosenberg
Attorney, Agent, or Firm—Arne I. Fors

[57] ABSTRACT

Insoluble mercury salts and any mercury in mercury-containing material are converted into a soluble form by controlled chlorination. The soluble forms of mercury in the chlorination solution are reduced with iron, preferably iron powder, to elemental mercury. After separation from the reduced solution, the solids from the reduction containing entrained mercury, are subjected to a separation for the separation and substantially quantitative recovery of substantially pure mercury. Separation by elutriation through a body of mercury is preferred. Prior to separation, the reduction solids may be kneaded for coalescence of fine mercury particles, followed by slurrying of the kneaded material. Any selenium in the reduced solution may be recovered in a reduction with a suitable reductant, preferably by adding strong sulfuric acid in the presence of the ferrous chloride formed in the preceding reduction, and excess sulfur dioxide. The process is carried out at ambient conditions, and the amount of liquid in the process is controlled. Substantially no mercury is discharged from the process in residues, or residual liquid.

11 Claims, 1 Drawing Sheet

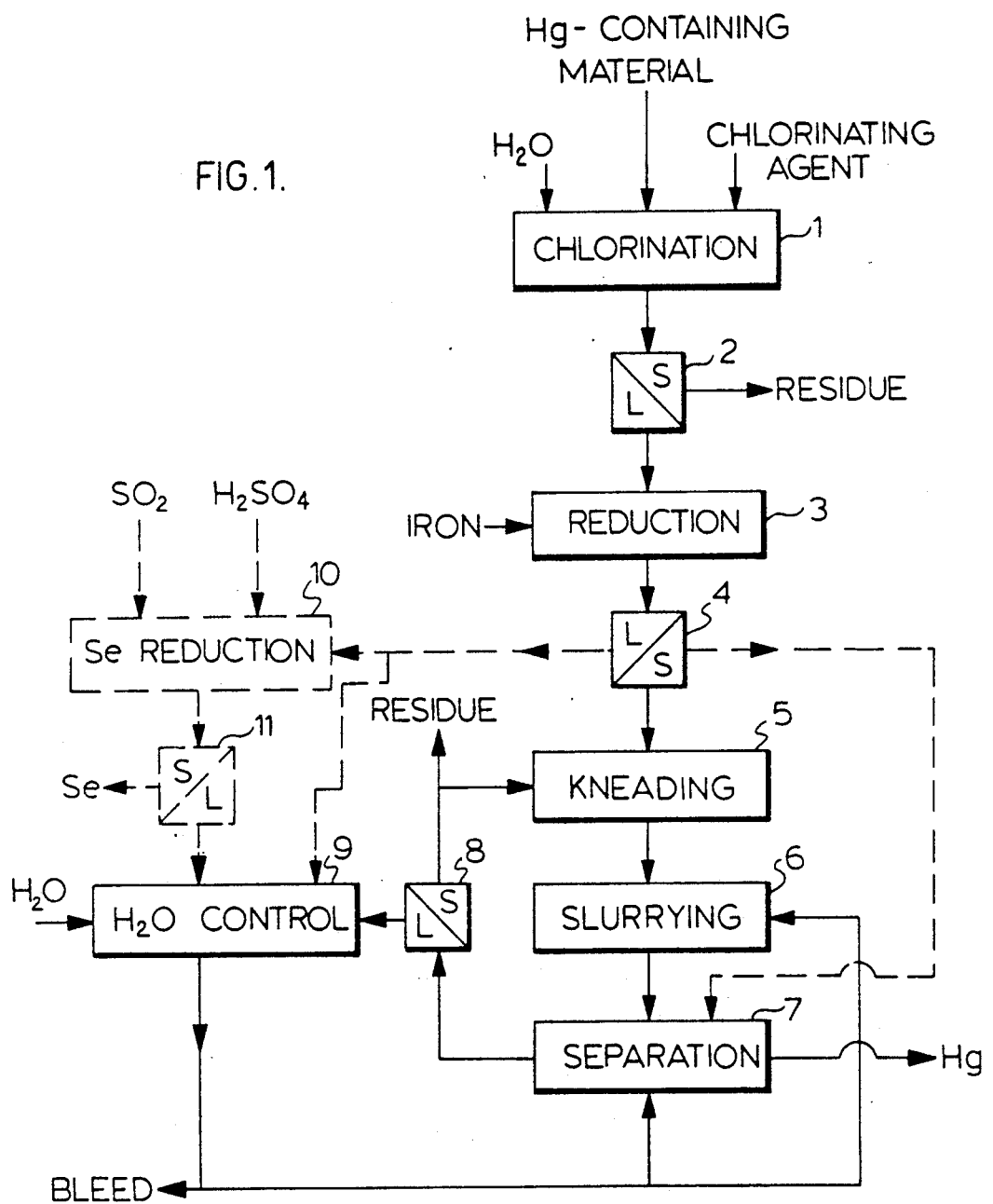

METHOD FOR THE RECOVERY OF MERCURY FROM MERCURY-CONTAINING MATERIAL

This invention relates to the recovery of mercury from mercury-containing material.

BACKGROUND OF THE INVENTION

Mercury is often contained as a minor constituent in mineral concentrates and is an undesirable metal in the treatment of such concentrates for the recovery of the desired mineral values. In various recovery processes, mercury tends to accumulate in intermediate metallurgical materials in certain process steps, as well as in off-gases and effluents from which the mercury is often removed in the form of mercury-containing material, such as wastes, residues, sludges, precipitates and the like. Similar mercury-containing material may be formed in the chemical process industry. This mercury-containing material can not be discarded, and must either be carefully stored or converted into a usable form. The mercury-containing material generally contains mercury in the form of mercurous and/or mercuric salts such as the chlorides, sulfates or nitrates. The conversion of these salts into a usable form could be accomplished by a reduction with the formation of elemental mercury.

BRIEF DESCRIPTION OF PRIOR ART

The reduction of salts of mercury can be accomplished by treating the salts in solution with sulfur dioxide or with a metal such as zinc, cadmium, nickel, iron, copper, bismuth or lead, or by electrolytic reduction. The various reductions are noted in J.W. Mellor's Comprehensive Treatise on Inorganic and Theoretical Chemistry, Longmans, Green and Co., London, 1923, vol.IV, p.703, 705, 831.

According to Japan Kokai 73/52625, an acidified solution of mercury salts is treated with sulfur dioxide and powdered metal(Zn, Al, Fe) to precipitate mercury sulfide. According to Polish Patent 83 977 (1976), combustion gases containing mercury are passed through adsorbers filled with iron chips, and mercury metal collects in the bottom. According to Russian Patent 981 417 (1982), mercury is recovered from acid solutions by reducing mercury salts with sulfur dioxide. According to Romanian Patent 84 123 (1984), mercury-containing gases and aqueous solutions are reduced by contacting with a scrap iron alloy, the scrap is heated, vaporized mercury is condensed, and mercury is recovered. A Japanese study of the removal of mercury from waste water (Chem. Abs. 105: 213690y) included treatment of solution with iron, and by aeration and precipitation.

The prior art reductions and processes have a number of disadvantages. With many mercury-containing materials in the forms mentioned above, the mercury formed by reductions, electrolytically or with sulfur dioxide or metal, is recovered either with a low efficiency in an impure form or in a form, such as mercury compounds, that can not be safely disposed and, therefore, requires further treatment.

SUMMARY OF THE INVENTION

We have now found that mercury-containing material can be converted into relatively pure, saleable mercury metal. More specifically, mercury in mercury-containing material in the form of sludges, wastes, residues, process streams and effluents, and containing a water-insoluble form of mercury including mercury and/or water-insoluble mercury salts, is converted into a soluble form that is subsequently reduced, and substantially pure mercury is recovered substantially quantitatively. No conversion is necessary if the material only contains water-soluble mercury. The conversion is carried out by chlorination to convert water-insoluble form of mercury in the material into soluble mercuric chloride under carefully controlled conditions. The solution containing dissolved mercury is separated and reduced. The reduction of the solution to give elemental mercury is carried out with iron under carefully controlled conditions. The elemental mercury is subsequently separated from the solids. By introducing the slurry from the reduction into a body of mercury metal, preferably in an elutriation vessel, fine mercury particles are removed more efficiently. Any metals in the mercury-containing material that are not solubilized in the chlorination, such as lead, are separated with the chlorination residue. The amount of water in the process is controlled.

In a preferred embodiment of the process of the invention, crude calomel resulting from a treatment of roaster or smelter gases is subjected to the chlorination, reduction and separation for the substantially quantitative recovery of a 99.99% pure mercury product from the mercury-containing material. Any selenium that may be present in the crude calomel will report to the solution that is recovered from the separation following the reduction with iron. The selenium may be recovered as selenium metal by reducing the solution with a suitable reducing agent under suitable conditions. The reduction of the solution may be accomplished with iron, sulfur dioxide, sodium sulfite, or with addition of sulfuric acid in conjunction with the ferrous iron already in solution. Substantially complete conversion to metallic selenium is obtained when the pH of the solution is adjusted to a value of about four and an excess of sodium hydroxide is added. Alternatively, substantially complete conversion is obtained by adding strong sulfuric acid and sulfur dioxide. This alternative conversion is preferred. The metallic selenium is recovered.

Accordingly, it is an object of the present invention to provide a method for the recovery of mercury from mercury-containing material. It is another object to provide a method for the recovery of mercury from crude calomel. It is a further object to provide a method for the recovery of mercury and selenium from mercury and selenium-containing material. These and other objects of the invention will become clear from the following detailed description of the invention.

In a first embodiment of the invention there is provided a method for the recovery of mercury from mercury-containing material in the form of sludges, wastes, residues, process streams and effluents and containing a water-insoluble form of mercury, which method comprises the steps of forming an aqueous slurry of said material; chlorinating said slurry by the controlled addition to said slurry of a chlorinating agent capable of converting said water-insoluble form of mercury to mercuric chloride and to form a dissolved mercury-containing chlorination solution and a chlorination residue; separating chlorination solution from chlorination residue; treating separated chlorination solution with an amount of iron in a reduction to reduce dissolved mercury to elemental mercury, to form a reduced solution, and to form reduction solids containing said elemental mercury; separating reduced solution from reduction solids; slurrying the separated reduction solids with aqueous solution to form an elemental mercury-containing slurry; feeding said elemental mercury-containing slurry to a separator capable of separating elemental mercury from said slurry; and recovering separated elemental mercury.

In a second embodiment of the invention, the mercury-containing material additionally contains selenium and said selenium substantially reports to said separated reduced solution, the material is treated according to the steps of the first embodiment and comprises the additional steps of treating separated reduced solution for the formation of elemental selenium and residual solution; separating formed elemental selenium from residual solution; and recovering said elemental selenium.

According to preferred embodiments, the chlorination is controlled and addition of chlorinating agent is continued until the oxidation reduction potential of the slurry in the chlorination has a value in the range of about 1100 to 1200 mV (Pt: Ag/AgCl); the separated chlorination solution is treated with finely divided iron in an amount in excess of the amount stoichiometrically required for the reduction of dissolved mercury to elemental mercury; said reduction with iron is continued until the oxidation reduction potential in the reduction has a value in the range of about 10 to 30 mV (Pt: Ag/AgCl); the separated reduction solids are subjected to kneading prior to said slurrying to form an elemental mercury-containing slurry; said separator is an elutriation vessel and said elemental mercury-containing slurry is fed to said vessel, and substantially pure elemental mercury is recovered from said vessel.

BRIEF DESCRIPTION OF DRAWING

The invention will now be described in detail with reference to the accompanying FIG. 1, which is a schematic flowsheet of the steps of the method of the invention.

DETAILED DESCRIPTION

The mercury-containing material that can be treated according to the method of the present invention includes wastes, sludges, residues, process streams and effluents that result from chemical and metallurgical processes. Aside from non-mercury matter, the material also contains water-soluble and water-insoluble mercury salts, such as mercurous and mercuric chloride, sulfate and nitrate, usually in combinations and including at least one water-insoluble mercury salt. Some materials may also contain some mercury in elemental form. The mercury-containing material containing a water-insoluble form of mercury is treated to solubilize the mercury. The soluble and solubilized forms of mercury are then reduced to elemental mercury that is subsequently recovered with an almost quantitative yield calculated on the mercury in the starting material. When no solubilization of insoluble mercury is carried out, the yield of elemental mercury is only a fraction of the quantitative yield.

With reference to FIG. 1, the mercury-containing material is subjected to a chlorination 1, wherein an aqueous slurry of the material is treated at ambient conditions with a suitable chlorinating agent capable of converting mercury and water-insoluble mercury salts to soluble mercuric chloride The chlorinating agent may be chlorine or a suitable oxychloride. Any lead that may be present in the material is not solubilized. In chlorination 1, an amount of mercury-containing material is added to a closed vessel together with an amount of water such that the solids density will give about 70 to 80 g/L Hg in solution upon conversion, which is a substantially maximum range for avoiding crystallization at ambient temperatures. The slurry in the vessel is agitated, and chlorinating agent is added in a controlled amount to a predetermined value of the oxidation reduction potential in the range of about 1100 to 1200 mV. The predetermined value is preferably in the range of 1140 to 1160 mV (Pt: Ag/AgCl). Preferably a slight excess of chlorinating agent is used to ensure substantially complete conversion to soluble mercuric chloride. Any selenium present in the material is also substantially solubilized, while any lead reports substantially to the chlorination residue.

Upon completion of the chlorination, the slurry is subjected to liquid-solid separation 2 for the formation of a dissolved mercury-containing chlorination solution and a chlorination residue. The term dissolved mercury includes mercuric chloride and any water-soluble mercury salts. The liquid-solids separations in the process are carried out using one or more of a number of conventional, known methods, such as settling, filtration and centrifuging. The chlorination residue contains any residual solids and substantially all lead, if present, in the original material.

The separated chlorination solution is passed from separation 2 to reduction 3. In reduction 3, the dissolve mercury in the chlorination solution is readily reduced to elemental mercury with an amount of iron and with the formation of reduction solids containing the elemental mercury and a reduced solution. The reduction is achieved rapidly and substantially quantitatively at ambient conditions in a suitable container and with agitation. The iron is used in a divided form, such as chips, shavings and the like. Preferably, the iron is used in a finely divided form, such as in the form of iron powder with particle sizes ranging from 30 to 2000 microns, preferably, 30 to 600 microns. Preferably, an excess of the amount required for the reduction is used. The excess is preferably in the range of about 6 to 20% of the amount stoichiometrically required to reduce mercuric chloride to mercury.

Reduction 3 is controlled by monitoring the oxidation reduction potential. A distinct end point of the reduction occurs when the potential has decreased to a value in the range of about 10 to 30 mV (Pt:Ag/AgCl). The size and excess of the iron powder used has an effect on the separation of elemental mercury in separation 7, to be described. The finer the iron powder, the more difficult it is to separate the mercury, resulting in lower recoveries of mercury. An excess of iron greater than about 20% causes the elemental mercury formed to be mixed with a large quantity of unreacted iron and, consequently, is more difficult to separate.

The reduced solution is separated from the reduction solids in liquid-solids separation 4. The separated solution may be removed from the process, or may be treated for the removal of any selenium, or passed to water control 9, to be described. The reduction solids may be directly subjected to separation 7, as indicated by the broken line, but are preferably treated prior to separation to improve the recovery of mercury. The prior treatment is best achieved by kneading the reduction solids in kneading 5, wherein the mercury is caused to coalesce into globules that are more easily separated. Solids from liquid-solids separation 8, to be described, are added to kneading 5. The kneading causes an increase in the recovery of mercury from separation 7. The kneading is carried out using conventional technique, such as slow agitation using a paddle or dough mixer, for a time sufficient, for example 10 to 30 minutes, to attain the desired degree of coalescence of the mercury as judged by the recovery of mercury from separation 7.

Upon completion of the kneading, the kneaded material is slurried in slurrying step 6. In step 6 the kneaded material is mixed with an amount of liquid to form an elemental mercury-containing slurry suitable for effecting the separation of the mercury metal. The liquid used for slurrying is water or liquid obtained from water control step 9, to be described.

The elemental mercury-containing slurry is subjected to separation 7, wherein elemental mercury is separated from the slurry and recovered. Separation 7 may be carried out by one of a number of methods in a suitable separator capable of separating elemental mercury from the slurry. A convenient and effective method is by elutriation.

The elutriation separation is conveniently carried out in an elutriation vessel, preferably a column. The slurry from slurrying step 6 is passed into the elutriation vessel and a liquid is passed upwardly through the slurry resulting in the separation of elemental mercury from residual solids and liquid. The separated mercury collects in the bottom of the vessel and is recovered therefrom. Mercury separation is enhanced by feeding the slurry into a pool of mercury contained in the elutriation vessel. The slurry from step 6 is fed into this pool, whereby large as well as small particles or globules of mercury are readily removed and retained in the pool, thereby improving recovery. The volume of the pool is kept substantially constant by removing the excess of the mercury from the vessel as product. The use of an elutriation column with a height sufficient to be effective in substantially separating the mercury, such as for example about 80 to 200 cm high, is preferred. Preferably, a pool of mercury is substantially retained in the lower portion of the column. The pool may, for example, occupy about half the height of the column. The liquid, that is, water or liquid from water control step 9, is fed into the bottom of the column, and passes upwardly through the mercury pool and slurry. Preferably, the mercury in the pool is substantially pure mercury. The liquid and any entrained solids overflow from the top of the column. The flowrate of liquid through the column is chosen such that effective and substantial separation of mercury is effected and essentially no mercury is entrained in the liquid overflowing from the top of the column. The linear velocity of the flow of liquid passed through the column may be as low as 50 cm/min or as high as 300 cm/min, depending on the size and density of the solids in the slurry and the requirement of substantially no mercury entrainment in the column overflow. The linear velocity is usually in the range of about 100 to 250 cm/min. If desired, the liquid flowrate may be varied during the elutriation. For example, a period of lower flowrate may be used to remove the bulk of the solids in the slurry into the overflow, and a flowrate in the higher end of the range may be used to remove the remaining solids into the overflow. The mercury recovered from separation 7 is substantially pure with a grade of about 99.99%.

The liquid from separation 7 which contains entrained solids, and substantially no mercury, is subjected to liquid-solids separation 8. The solids may be passed to kneading 5 or may be removed from the process as a substantially mercury-free residue. The liquid is passed to water control 9.

In water control 9, the liquid fractions from liquid-solids separations 4, 8 and (optionally) 11 are collected in a suitable vessel. The collected liquid is used in the separation 7 and for slurrying kneaded material in slurrying step 6. Excess liquid may be removed as bleed, and any deficiency may be made up by adding water.

When the mercury-containing material treated in the process contains selenium, the selenium may be recovered. Any selenium is solubilized and reports in the reduced solution from reduction 3. The separated reduced solution from separation 4 may, therefore, be, optionally, all or partly treated in selenium reduction 10.

Selenium reduction 10 may be carried out with a suitable reductant such as, for example iron, sulfur dioxide, sodium sulfite, or, since ferrous iron is already present from reduction 3, by addition of sulfuric acid. Except for the addition of sulfuric acid (four Molar), conversions to elemental selenium with these reductants were less than 50%. Substantially complete reduction with conversions well over 90% were obtained when adding either strong sulfuric acid, or adding an excess of sodium hydroxide after adjusting the pH of the solution to a value of about four, or adding strong sulfuric acid and an excess of sulfur dioxide. The latter method is preferred as conversions are substantially complete. The reduction using sodium hydroxide also causes ferrous hydroxide to precipitate that must be re-dissolved by acidifying. The preferred selenium reduction 10 is readily carried out at ambient conditions with the addition of sulfuric acid, for example four Molar, and an excess of, for example, four times the stoichiometric amount of sulfur dioxide. The formed selenium is subsequently separated from the residual solution in liquid-solids separation 11. The selenium is recovered as product, and residual solution is passed to water control 9.

The invention will now be illustrated by the following non-limitative examples.

The mercury-containing material used in the examples was obtained from roaster gases containing sulfur dioxide which were scrubbed and treated for the production of sulfuric acid. The mercury in this process was recovered in the form of a sludge that contained mercury mainly as calomel and some sulfate, as well as substantive amounts of lead and selenium.

EXAMPLE 1

This example illustrates the conversion of calomel and mercury sulfate into mercuric chloride. A number of tests were carried out wherein an amount of the mercury-containing material, containing 74.3% Hg, 0.65% Se, 3.65% Pb, 13.2% Cl and 0.9% S, was slurried in water to a solids content that would give a chlorination solution containing 80 g/L Hg. Excess chlorine was passed through 4 liters of the agitated slurry at an initial rate of 45 g/L.h, while the oxidation reduction potential (ORP) was monitored; a consistent end point was reached in each test. The chlorination solution had an averaged analysis of 76 g/L Hg, 0.71 g/L Se and 0.02 g/L Pb. The test data and results are given in Table I.

TABLE I

| Hg in Feed | C12 Use | | Final ORP* | Hg in Solution | | Residue | | | |
|---|---|---|---|---|---|---|---|---|---|
| | | | | | | Wt | Hg | Se | Pb |
| g | g | % Excess | mV | g/L | % Conversion | (g) | % | % | % |
| 297 | 79.9 | 52 | 1212 | 76.2 | 100 | 17.7 | 8.1 | 0.19 | 58.6 |
| 297 | 67.3 | 28 | 1168 | 71.2 | 96 | 24.8 | 19.7 | 0.83 | 49.3 |
| 297 | 84.6 | 61 | 1202 | 71.3 | 96 | 18.7 | 3.7 | 2.10 | 62.5 |
| 284 | 67.3 | 34 | 1179 | 67.8 | 91 | 21.8 | 9.0 | 2.20 | 58.9 |
| 303 | 69.5 | 29 | 1163 | 79 | 100 | 22.2 | 10.0 | 0.19 | 57.7 |
| 304 | 71.7 | 33 | 1167 | 74 | 95 | 25.5 | 7.8 | 0.18 | 59.6 |
| 304 | 73.9 | 37 | 1160 | 75 | 97 | 25.0 | 8.6 | 0.20 | 59.4 |
| 305 | 75.8 | 41 | 1173 | 80 | 100 | 26.2 | 7.6 | 0.16 | 49.9 |

*Pt: Ag/AgCl reference

The data in Table I show that from 90 to 100% of the mercury in the feed was converted into mercuric chloride, substantially all lead (99%) reported to the chlorination residue, and substantially all selenium (up to 98%) was solubilized. The mercury contained in the residue was in the liquid entrained with the residue and could be substantially removed by washing the residue. The excess chlorine can be significantly reduced (to about 20%) by using a covered reaction vessel and by controlling the rate of addition, for example, by decreasing the rate during chlorination from an initial higher to a subsequent lower value.

EXAMPLE 2

This example illustrates the reduction of mercuric chloride to mercury with iron powder. Four liters of chlorination solution was treated in each of a number of tests with an excess of a coarse or fine iron powder at ambient conditions. The particle sizes of the fine powder were 90% <44 microns and 9% <75 to 44 microns, and of the coarse powder were 20% <74 microns, 25% <150 to 74 microns and 55% <590 to 150 microns. The oxidation-reduction potential of each test was monitored during the addition of iron. Iron addition was halted at the distinct end point of the reduction of 20 mV (Pt: Ag/AgCl). The test data and results are given in Table II.

TABLE II

| Test No. | Feed Solution | | Iron Used | | Barren Solution | | % Hg Conversion |
|---|---|---|---|---|---|---|---|
| | g/L Hg | g/L Se | Type | % Excess | g/L Hg | g/L Se | |
| 1 | 76.0 | 0.86 | Coarse | 85 | 0.022 | 0.94 | 99.9 |
| 2 | 69.7 | 0.73 | Fine | 38 | 0.0025 | 0.72 | 99.9 |
| 3 | 72.4 | 0.73 | Coarse | 37 | 0.005 | 0.64 | 100 |
| 4 | 81.3 | 0.71 | Coarse | 15 | 0.035 | 0.66 | 100 |
| 5 | 81.3 | 0.65 | Coarse | 15 | 0.030 | 0.66 | 100 |
| 6 | 81.3 | 0.72 | Fine | 6 | 0.008 | 0.64 | 100 |

As can be seen from the test results, the reduction to mercury was virtually 100% in all tests. Large excesses of iron are not necessary but a slight excess is desirable.

EXAMPLE 3

After separation from the reduced solution, the reduction solids from each test of Example 2 (average analysis 82% Hg, 4% Fe) were kneaded and subsequently slurried by the addition of water. The slurry was passed through an elutriation column at a rate of 1.8 L/h. The column, 80 cm high and 3.2 cm diameter, contained a 30 cm high pool of mercury obtained from previous tests. The slurry was fed into the mercury layer. Water was passed upwardly through the column at an initial linear velocity of 110 cm/min. After visual determination that most solids had been elutriated (after 1 h) and flushed from the column, the rate was increased to 250 cm/min for 0.5 h. It was observed that some solid particles (mostly iron) remained on top of the mercury. The particles could be dissolved by passing dilute acid through the column. The accumulated mercury was tapped off during elutriation to retain a constant volume of mercury in the column. The mercury recoveries, impurity levels and grades are given in Table III.

TABLE III

| Table II Test No. | % Hg Recovered | Impurity Levels in ppm | | | Hg Grade |
|---|---|---|---|---|---|
| | | Se | Pb | Fe | |
| 1 | 59 | <0.1 | 2 | <0.5 | 99.97 |
| 2 | 32 | — | — | — | — |
| 3 | 100 | <0.1 | 0.2 | <0.5 | 99.99 |
| 4 | 96 | <0.1 | <0.1 | <0.5 | 99.99 |
| 5 | 97 | <0.1 | <0.1 | <0.5 | 99.99 |
| 6 | 94 | <0.1 | <0.1 | <0.2 | 99.99 |

The results show that substantially pure mercury can be recovered with recoveries of better than 90% by elutriation of the reduction solids that were obtained from a reduction with iron powder in 15% excess for coarse powder and 6% excess for fine powder. It was observed that kneading is particularly necessary when fine iron powder was used, as the use of fine powder resulted in more fine mercury particles being present in the reduction solids.

EXAMPLE 4

This example illustrates that selenium can be substantially recovered from a reduced solution, obtained from the reduction of mercuric chloride, after separation from the reduction solids. Various reductants and/or sulfuric acid were added to reduced solution that contained 0.7 g selenium per liter. The tests were carried out at ambient conditions, with agitation and for 0.5 to 2 h. The method, amount added and the selenium conversion calculated from the analysis results are given in Table IV. In the reductions with sulfuric acid (tests 4-7), the reduction occurs substantially through the oxidation of ferrous iron already present, with the reduction of selenium being enhanced by the addition of the acid.

TABLE IV

| No. | Reduction Method | Amount Added | Se conversion in % |
|---|---|---|---|
| 1 | iron | 10x stoichiometric amount | 11 |
| 2 | $SO_2$ | 15x stoichiometric amount | 9 |
| 3 | $Na_2SO_3$ | 10x stoichiometric amount | 9 |
| 4 | $H_2SO_4$ | up to one Molar | 9 |
| 5 | $H_2SO_4$ | up to two Molar | 48 |
| 6 | $H_2SO_4$ | up to four Molar | 96 |
| 7 | $H_2SO_4 + SO_2$ | 4M $H_2SO_4$, 4x stoichiometric $SO_2$ | 99 |
| 8 | nascent $Fe(OH)_2$ | adjust pH to 4, add 10x stoichiometric NaOH | 99 |

As can be seen from the results, test no. 6 had a high conversion (96%) of dissolved selenium to elemental conversion (96%) of dissolved selenium to elemental selenium, and the methods of test no. 7 and 8 gave substantially complete conversion. The selenium was readily recovered from the reduction, but in test 8 it was necessary to first redissolve the ferrous hydroxide by acidification.

It is understood that variations and modifications may be made in the embodiments of the invention without departing from the scope of the appended claims.

We claim:

1. A method for the recovery of mercury from mercury-containing material in the form of sludges, wastes, residues, process streams and effluents and containing a water insoluble form of mercury, which method comprises the steps of: forming an aqueous slurry of said material; chlorinating said slurry by the addition to said slurry of a chlorinating agent capable of converting said water-insoluble form of mercury to mercuric chloride, and to form a dissolved mercury-containing chlorination solution and a chlorination residue, the addition of said chlorinating agent being continued until the oxidation reduction potential of the slurry in the chlorination has a value in the range of about 1100 to 1200 mV (Pt: Ag/AgCl); separating chlorination solution from chlorination residue; treating separated chlorination solution with an amount of iron in a reduction to reduce dissolved mercury to elemental mercury, to form reduced solution, and to form reduction solids containing said elemental mercury; separating reduced solution from reduction solids; slurrying the separated reduction solids with aqueous solution to form an elemental mercury-containing slurry; feeding said elemental mercury-containing slurry to a separator capable of separating elemental mercury from said slurry; and recovering separated elemental mercury.

2. A method as claimed in claim 1, wherein said mercury-containing material additionally contains selenium, said selenium substantially reports to said separated reduced solution, and said method comprises the additional steps of treating separated reduced solution for the formation of elemental selenium and residual solution; separating formed elemental selenium from residual solution; and recovering said elemental selenium.

3. A method as claimed in claim 1, wherein said separated chlorination solution is treated with finely divided iron in an amount in excess of the amount stoichiometrically required for the reduction of dissolved mercury to elemental mercury.

4. A method as claimed in claim 1, wherein said reduction with iron is continued until the oxidation reduction potential in the reduction has a value in the range of about 10 to 30 mV (Pt: Ag/AgCl).

5. A method as claimed in claim 1, wherein said separated reduction solids are subjected to kneading prior to said slurrying to form said elemental mercury-containing slurry.

6. A method as claimed in claim 1, wherein said separator is an elutriation vessel, said elemental mercury-containing slurry is fed to said elutriation vessel, and substantially pure mercury is recovered from said vessel.

7. A method as claimed in claim 1, wherein said separator is an elutriation vessel, said elemental mercury-containing slurry is fed into a pool of elemental mercury contained in said vessel, elemental mercury contained in said slurry is substantially retained in said pool, and substantially pure mercury is recovered from said vessel.

8. A method as claimed in claim 1, wherein said separator is an elutriation column, said elemental mercury-containing slurry is fed into a pool of substantially pure elemental mercury retained in said column, liquid is passed upwardly through said pool and said slurry at a linear velocity in the range of about 50 to 300 cm/min., mercury is substantially retained in said column, and substantially pure mercury is recovered from said column.

9. A method as claimed in claim 2, wherein said separated reduced solution is treated for substantial conversion of contained selenium to elemental selenium with sulfuric acid and sulfur dioxide in excess of the amounts required to reduce selenium in said solution to elemental selenium.

10. A method for the recovery of mercury from mercury-containing material in the form of sludges, wastes, residues, process streams and effluents and containing a water-insoluble form of mercury, which method comprises the steps of: forming an aqueous slurry of said material; chlorinating said slurry by the controlled addition of a suitable chlorinating agent to said slurry until the oxidation reduction potential of the slurry has a value in the range of about 1100 to 1200 mV (Pt: Ag/AgCl) to convert said water-insoluble form of mercury to mercuric chloride, and to form a dissolved mercury-containing chlorination solution and a chlorination residue; separating chlorination solution from chlorination residue; treating separated chlorination solution with an amount of iron having particle sizes in the range of about 30 to 2000 microns in a reduction to reduce dissolved mercury to elemental mercury until the oxidation reduction potential in said reduction has a value in the range of about 10 to 30 mV (Pt: Ag/AgCl), and to form reduced solution and to form reduction solids containing said elemental mercury; separating reduced solution from reduction solids; subjecting separated reduction solids to kneading; slurrying the kneaded reduction solids with aqueous solution to form an elemental mercury-containing slurry; feeding said elemental mercury-containing slurry into a pool of substantially pure elemental mercury in an elutriation column; passing liquid upwardly through said column at a linear velocity in the range of about 100 to 250 cm/min.; substantially retaining elemental mercury in said column; and recovering substantially pure elemental

11. A method as claimed in claim 10, wherein said mercury-containing material additionally contains selenium, said selenium substantially reports to separated reduced solution, and said method comprises the additional steps of treating separated reduced solution with sulfuric acid and sulfur dioxide in excess of the amounts required to reduce selenium to elemental selenium; and recovering elemental selenium formed in said treating.

* * * * *